W. B. CONYNGHAM.
SECTIONAL GEAR WHEEL.
APPLICATION FILED JULY 29, 1920.
1,391,719.
Patented Sept. 27, 1921.
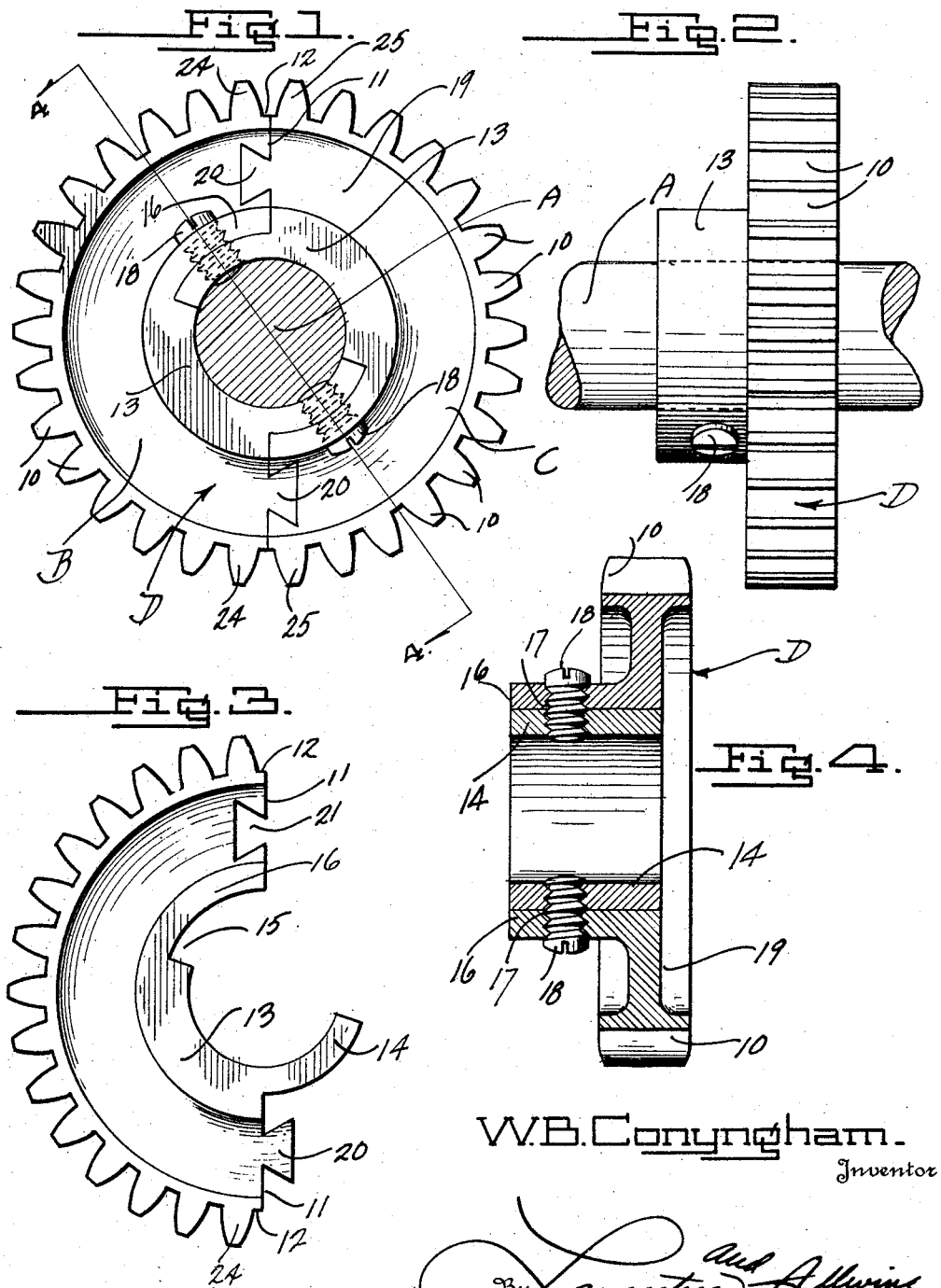

UNITED STATES PATENT OFFICE.

WILLIAM B. CONYNGHAM, OF WILKES-BARRE, PENNSYLVANIA.

SECTIONAL GEAR-WHEEL.

1,391,719.  Specification of Letters Patent.  Patented Sept. 27, 1921.

Application filed July 29, 1920. Serial No. 399,700.

*To all whom it may concern:*

Be it known that I, WILLIAM B. CONYNGHAM, a citizen of the United States, residing at Wilkes-Barre, in the county of Luzerne and State of Pennsylvania, have invented certain new and useful Improvements in Sectional Gear-Wheels, of which the following is a specification.

This invention relates to improvements in sectional gear wheels.

An important object of this invention is the provision of a sectional gear wheel, embodying means which will effectively lock the sections together to prevent pulling apart thereof, as well as to prevent translational movement with respect to each other.

A further object of the invention is the provision of a sectional gear wheel for the purpose of facilitating assembling on a shaft without taking down the shaft, or the performance of any other work incidental thereto, excepting that which pertains merely to the locking of the two sections upon the shaft.

A further object of the invention is the provision of a sectional gear wheel comprising a plurality of sections, which are in effect companion members, and having embodied therewith a means for locking said members together, which means can also be used as a means for keying the assembled gear wheel to a shaft.

Other objects and advantages will be apparent during the course of the following detailed description.

In the accompanying drawings, forming a part of this specification, in which like reference characters designate like parts throughout the same:

Figure 1 is a front elevation of the gear wheel.

Fig. 2 is a side elevation of the gear wheel showing the same locked to a drive shaft.

Fig. 3 is a front elevation of one of the sectional members comprising the gear wheel.

Fig. 4 is a cross sectional view taken on the line 4—4 of Fig. 1.

In the drawings, wherein for the purpose of illustration is shown a preferred embodiment of my invention, the letter A designates a drive or driven shaft having the sections B and C of the gear wheel D securely locked thereto, in such manner as to provide a gear wheel capable of operating much in the same manner as an ordinary solid gear.

The sections B and C are so constructed that each section contains an equal number of the gear teeth 10 it being preferred that the sections B and C have their abutting faces 11 so cut upon the gear wheels that said faces do not intersect a gear tooth but rather intersect the periphery of the root circle 12.

Each section B and C is preferably provided with an extending hub 13 projecting laterally of the plane of one of its sides, and provided with an extending portion 14 preferably concentric with the said gear wheel and having a projection seat 15 cut therein and adapted to receive the projection 14 of an adjacent section. It will thus be observed that when the sections B and C are assembled together each of the sections has a projecting member 14 which fits into a corresponding projection seat 15 of its adjacent member, and provided with an extending portion 16 of the hub 13 which overlies said projection 14. As a means for preventing the translational movement of the member B with respect to the member C, the overlying portion 16 of one section and the projection 14 of the other section, are preferably provided with tapped holes 17 adapted to receive a set screw 18 for securely locking said sections. Since the tapped hole 17 extends entirely through the hub section 13 it can be clearly seen from Fig. 1 of the drawings that the set screw 18 also serves as a means of securely keying the gear wheel D to the drive or driven shaft A.

In the type of gear wheel shown, it is preferred that the flange 19 thereof be solid, although it is to be understood that arms could here be provided to take the place of the solid flanges as in the course of ordinary gear wheel construction. The solid portion 19 is preferably provided intermediate the hub section 13 and the teeth 10 thereon with dove tailed projections 20 and a dove tailed seat 21. Since it is desired that each section be provided with one of the projections 20 and a dove tailed seat 21, it can readily be seen that when the projections are assembled together, that a dove tailed projection 20 of one section is adapted to fit within a corresponding dove tailed seat 21 of its adjacent section, thus providing a means to prevent pulling apart of the sections B and C of the gear wheel D.

While sectional gear wheels have heretofore been constructed, they have been found to be faulty where accurate gearing was desired, in that the backlash due to imperfect fitting of the sections thereof, was so great as to prevent a fine adjustment. The sectional gear wheel herewith shown while comparatively simple and one which will be economical to construct, yet embodies a means not only to prevent pulling apart of the various sections, but also a means, namely, the set screws 18 which prevent translation movement of the sections with respect to each other upon the shaft A, and which means also serve the function of locking the gear wheels to the said shaft. The space between the gear teeth 24 and 25, and wherein lies the great difficulty of a sectional gear wheel, is that of being held to be constant with respect to the space between any other two teeth upon the gear wheel C. It is to be understood that the form of my invention herewith shown and described is to be taken as a preferred example of the same and that various changes in the shape, size and arrangement of parts may be resorted to without departing from the spirit of the invention or the scope of the subjoined claims.

I claim:

1. In a sectional gear wheel, the combination with a shaft, of a pair of sections forming the gear wheel, said sections being dove tailed to prevent pulling apart thereof with respect to each other, and means to prevent translational movement with respect to each other, said means also adapted to key the gear sections to the shaft.

2. In a sectional gear wheel, the combination of a pair of sections, each including a web and a hub portion, said web portion of each being provided with a projecting dove tail integral thereon, and a dove tail seat therein, said sections when assembled together adapted to have a dove tail of one section seated in a dove tailed seat of another section to prevent pulling apart of said sections; and means for clamping said hub portions of the sections together to prevent translational movement of said sections.

3. In a sectional gear wheel, the combination with a shaft, of a pair of sections comprising the gear wheel, said sections each having a projection thereon concentric with said shaft, and a projection seat therein concentric with said shaft, said sections adapted to be fitted together having a projecting portion of one section snugly seated within the projection seat of its adjacent section, and means for locking said projections in their seats, said projecting portions of one section so snugly fitted within the projecting portion of its adjacent section, that upon clamping of said projections by said locking means there will be no distortion of said sections.

4. In a sectional gear wheel, the combination of a pair of coöperating sections, each including a web portion and an integral hub portion, interfitting means carried by said web portions for locking said sections together from pulling apart, interfitting means for said hub portions, and means for clamping said interfitting hub portions together to prevent translational movement of the sections.

5. In a sectional gear wheel, the combination with a shaft of a pair of dove tailed sections, said dovetails provided to prevent pulling apart of the sections, said sections each having a projection thereon concentric with said shaft, and a projection seat therein concentric with said shaft, said sections adapted to be fitted together having a projecting portion of one section seated within the projection seat of its adjacent section.

6. In a sectional gear wheel, the combination with a shaft, of a pair of dove tailed sections, each section comprising substantially one half of the entire gear wheel, said dove tails provided to prevent pulling apart of the sections, said sections each having a projecting portion thereon concentric with said shaft, and a projection seat therein also concentric with said shaft, said sections adapted to be fitted together having a projecting portion of one section seated within the projection seat of the adjacent section, and means for locking said projecting portions in their respective seats, to prevent translational movement of the sections with respect to each other, said means also provided to key said gear wheel to the shaft.

7. In a sectional gear wheel, the combination of a pair of dove tailed sections comprising a gear wheel, said dovetails provided to prevent pulling apart of the section, each of said sections having a projecting portion adapted to fit into a seat in an adjacent portion, and means to lock the projecting portion of one section into the projection seat of its adjacent section to prevent translational movement with respect to each other.

8. In a sectional gear wheel, the combination with a shaft, of a pair of sections, each of said sections including a web portion, and a hub portion integral therewith, each of said hub portions having a projection thereon concentric with said shaft, and extending the entire width of said gear wheel, and a projection seat therein concentric with said shaft and extending the entire width of said wheel, said sections adapted to be fitted together having a projecting portion of one section seated within the projection seat of the adjacent section.

9. In a sectional gear wheel, the combination with a shaft, of a pair of sections comprising a gear wheel, said sections each having a projection thereon concentric with said shaft, and extending the entire width of said section, and a projection seat therein concentric with said shaft and extending the entire width of said section, said sections adapted to be arranged on said shaft and slid thereon until a projecting portion of one section is seated within the projection seat of its adjacent section.

10. In a sectional gear wheel, the combination of a pair of sections each including a web and a hub portion integral therewith, said web portion of each being provided with a projecting dove tail, and a dove tail seat, the hub portions of each of said sections provided with a projection thereon concentrically arranged with respect to said gear wheel, and extending the entire width of said section, and a projection seat therein concentric with said wheel, and extending the entire width of said sections, said sections when assembled together adapted to have a dove tail of one seated in a dove tail seat of another to prevent pulling apart of said sections, and having a projecting portion of one hub section seated within its concentric seat of its adjacent section.

11. In a sectional gear wheel, the combination with a shaft, of a pair of sections comprising a gear wheel, each of said sections including a web portion, a hub portion, said hub portions each having a projection thereon concentric with said shaft, and a projection seat therein concentric with said shaft, said sections adapted to be fitted together having a projecting portion of one section seated within projection seat of its next adjacent section.

WM. B. CONYNGHAM.